United States Patent [19]
Vidales

[11] Patent Number: 5,905,716
[45] Date of Patent: May 18, 1999

[54] ASYNCHRONOUS FULL DUPLEX COMMUNICATIONS OVER A SINGLE CHANNEL

[75] Inventor: Carlos Eduardo Vidales, Raleigh, N.C.

[73] Assignee: Ericsson, Inc., Research Triangle Park, N.C.

[21] Appl. No.: 08/762,459

[22] Filed: Dec. 9, 1996

[51] Int. Cl.[6] .................................... H04B 1/56
[52] U.S. Cl. ........................ 370/276; 370/508; 370/517
[58] Field of Search .................................. 370/274, 275, 370/276, 279, 293, 277, 280, 296, 350, 352, 252, 286, 294, 301, 304, 498, 506, 508, 519, 517; 375/355, 356, 219; 359/113, 127, 152, 114, 154, 158, 159

[56] References Cited

U.S. PATENT DOCUMENTS

| | | | |
|---|---|---|---|
| 3,721,763 | 3/1973 | Homan et al. | 370/282 |
| 3,967,058 | 6/1976 | Moriya et al. | 370/294 |
| 4,012,590 | 3/1977 | Haass | 370/285 |
| 4,112,253 | 9/1978 | Wilhelm | 370/284 |
| 4,117,277 | 9/1978 | van den Elzen et al. | 370/286 |
| 4,326,287 | 4/1982 | Abramson | 370/276 |
| 4,399,563 | 8/1983 | Greenberg | 359/113 |
| 5,216,667 | 6/1993 | Chu et al. | 370/276 |
| 5,253,095 | 10/1993 | Menadier et al. | 359/174 |
| 5,289,459 | 2/1994 | Brownlie | 370/252 |
| 5,359,594 | 10/1994 | Gould et al. | 370/276 |
| 5,434,905 | 7/1995 | Maeda et al. | 370/350 |
| 5,469,285 | 11/1995 | Gut | 375/219 |
| 5,517,492 | 5/1996 | Spear | 370/280 |
| 5,524,274 | 6/1996 | Takahashi et al. | 370/280 |
| 5,579,308 | 11/1996 | Humpleman | 370/352 |
| 5,631,757 | 5/1997 | Bodeep et al. | 370/276 |

FOREIGN PATENT DOCUMENTS

| | | |
|---|---|---|
| 0524390 | 5/1992 | European Pat. Off. . |
| 1401436 | 7/1975 | United Kingdom . |

OTHER PUBLICATIONS

Patent Abstracts of Japan, vol. 010, No. 205 (E–420), 17 Jul. 1986 & JP 61 048250 A (Toshiba Corp.), 8 Mar. 1986.

*Primary Examiner*—Dang Ton
*Assistant Examiner*—Phirin Sam
*Attorney, Agent, or Firm*—Burns, Doane, Swecker & Mathis, L.L.P.

[57] ABSTRACT

A method and apparatus for providing full duplex asynchronous communication between two transceivers in a communication system is disclosed. First each bit period is divided in half creating a transmit half bit period and a receive half bit period wherein each transceiver can transmit data during the transmit half bit periods and can receive data during the receive half bit periods. The bit periods of the two transceivers are synchronized so that the transmit half bit periods of each transceiver are aligned with the receive half bit periods of the other transceiver.

21 Claims, 3 Drawing Sheets

ASYNCHRONOUS FULL DUPLEX COMMUNICATIONS OVER A SINGLE CHANNEL

FIELD OF THE INVENTION

The present invention relates to the transmission of data in a communications system and more particularly to a method to implement full duplex asynchronous serial data communication links through a single channel or physical data pipe where only half duplex data exchanges are otherwise possible.

BACKGROUND OF THE INVENTION

A common way to asynchronously transmit data over serial links is by impressing a stream of "bits" onto a medium. A character like the letter "A", which is represented by the set of bits "01000001" in the ASCII table, is transmitted as shown in FIG. 1. The set of bits are transmitted least significant bit (LSB) first and is preceded by a start bit. A '1' is represented by a mark or positive level and a '0' is represented by a space. The serial stream is recovered with the help of a pacing clock at the receiver end. The marks and spaces occupy the entire bit period and separate paths are required for full duplex data exchanges.

When the medium is free space and light pulses are used to transmit data, the serial bitstream may appear as illustrated in FIG. 2. In this system, a '1' is represented by the absence of light and a '0' by a short light pulse falling within a given time window. As before, a clock at the receiver is used to recover and stretch the bits so that the recovered bitstream appears like the bitstream illustrated in FIG. 1. For the case illustrated in FIG. 2, since the transmit and receive paths are the same medium, i.e., free space, the transceiver typically shuts down its receiver when transmitting full blocks of bits and refrains from transmitting when receiving blocks of bits. Thus, the system is half duplex since the data communication devices must take turns to transmit through the medium. Bandwidth used by one device is unavailable to the other. It would thus be advantageous to provide a method and a system for full duplex communication where only half duplex communication was originally possible.

Simultaneous bi-directional communication systems are known in the art. U.S. Pat. No. 3,721,763 illustrates two separate unipolar transmitters which transmit pulses of the same polarity are utilized with a two-wire connecting system. Inverting transformers are interposed between the transmitter and the receiver at each end so that the received pulses are inverted for recognition and to avoid interference with positive pulses being simultaneously transmitted at the same end. However, a ground connection is also shown and can be inferred as being a three-wire connection between the transmitter and receiver and this ground connection introduces the possibility of ground loop interference which is most undesirable.

Other illustrative patents showing two-wire simultaneous bi-directional communication are U.S. Pat. Nos. 4,012,590, 4,112,253, and 4,117,277. These patents show alternative approaches to the basic problem but utilize other communication techniques in which the current or voltage levels are compared or differentiated or in which special encoding and decoding operations are conducted to accommodate the bi-directional simultaneous communication.

One of the problems with these systems is the need to provide proper synchronization between transmitting and receiving. U.S. Pat. No. 4,326,287 discloses placing a phase locked loop at each receiver to extract the clocking information from the transmitted signals for synchronizing the return transmission to avoid overlap of pulses and for determining whether a received bit is a 1 or a 0. One problem with phase locked loops is they are relatively complex and expensive. The phase locked loop is usually tuned to a particular frequency and requires retuning when changing baud rates.

SUMMARY OF THE INVENTION

It is an object of the present invention to provide an asynchronous full duplex communication which maintains synchronization between the transmit window and the receive window which does not require the use of a phase lock loop to synchronize the receiver frequency to the frequency of the transmitter.

According to one embodiment of the present invention, a method that enables asynchronous full duplex communication within the same physical medium is disclosed. According to one embodiment of the present invention, half of the baud period is assigned for transmit pulses while the other half of the baud period is assigned to receive pulses.

According to one embodiment of the present invention, a method for providing full duplex asynchronous communication between two transceivers in a communication system is disclosed. First each bit period is divided in half creating a transmit half bit period and a receive half bit period wherein each transceiver can transmit data during the transmit half bit periods and can receive data during the receive half bit periods. The bit periods of the two transceivers are synchronized so that the transmit half bit periods of each transceiver are aligned with the receive half bit periods of the other transceiver.

According to another embodiment of the present invention, a communication system which allows full duplex asynchronous communication between two devices is disclosed. In the system, each device has a transceiver and a communication link is provided between the two devices over which data is transmitted in bitstreams which have a bit rate. Means is provided for dividing each bit period in half to create a transmit half bit period and a receive half bit period, wherein each transceiver can transmit during the transmit half bit period and can receive during the receive half bit period. Synchronizing means is provided to synchronize the bit periods of the two transceivers so that the transmit half bit periods of each transceiver is aligned with the receive half bit periods of the other transceiver.

BRIEF DESCRIPTION OF THE DRAWINGS

These and other features and advantages of the invention will be readily apparent to one of ordinary skill in the art from the following written description, used in conjunction with the drawings, in which.

DETAILED DESCRIPTION

The full duplex method described below effectively doubles the data throughput that would otherwise be obtained using a half duplex technique. It will be understood by one skilled in the art that the technique is useful in a variety of applications wherein the transmission medium can be free space, optical fiber, or wired serial links but is not limited thereto.

Figure 1:
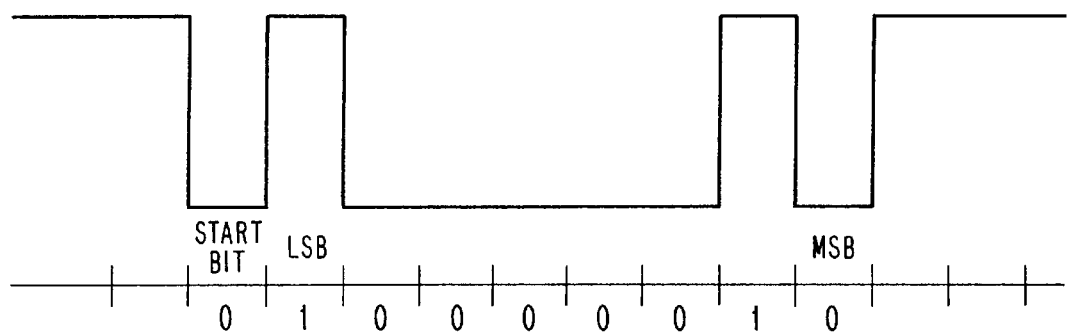
FIG. 1 illustrates an asynchronous serial character transmission.
Figure 2:
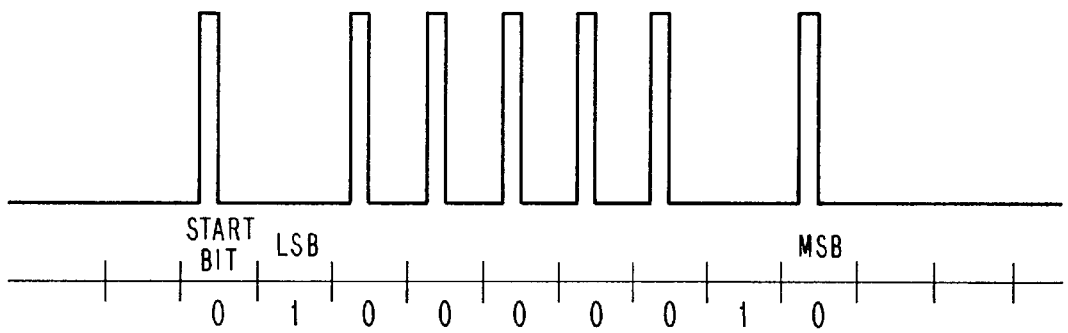
FIG. 2 illustrates an asynchronous infrared serial stream.
Figure 3:
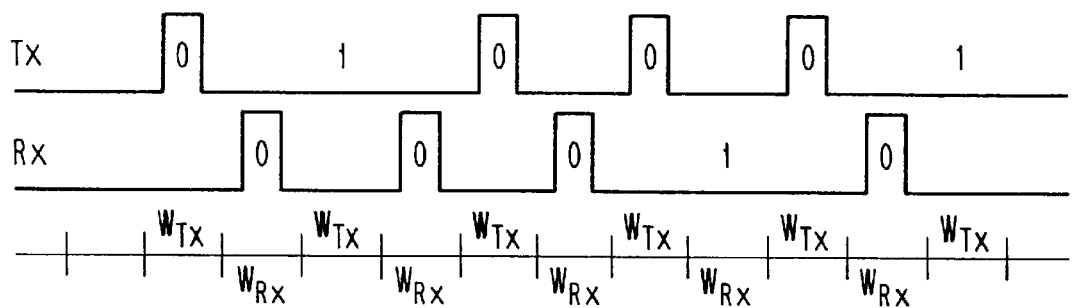
FIG. 3 illustrates transmit/receive bit interleaving according to one embodiment of the present invention.

The inventive full duplex method builds on the idea of representing bits as pulses, and takes advantage of the time window between transmitted bits and received bits. FIG. 3 shows the relative timing between transmitted and received bitstreams as seen by either of the communicating devices (transceivers). FIG. 3 illustrates a device which is transmitting the bitstream "010001 . . ." and receiving the bitstream "00010 . . .". According to the present invention, the bit period is divided into two halves: one being used for transmission and the other being used for reception. Thus, the device is allowed to transmit during a transmit window ($W_{Tx}$) whose width is one-half of the bit period and the device looks to receive bits during a receive window ($W_{Rx}$) which has a width of half of the bit period.

Since each data communication device runs on a different clock and since these clocks can be expected to run at slightly different speeds, the phase relationship between transmit pulses and receive pulses cannot be expected to be maintained, or even attained unless a suitable mechanism to synchronize bit generation is provided. The present invention provides the mechanism to properly synchronize the transmission of bits by either device. The proposed mechanism is a state machine which is implemented by a processor in at least one of the transceivers (Universal Asynchronous Receiver/Transmitter) wherein the state machine is paced by a clock at least eight times faster than the baud or bit rate of the transmission. The present invention will now be described wherein the state machine is paced by a clock which is eight times faster than the baud rate, but the present invention is not limited thereto. With a clock eight times faster than the baud rate, the bit period can be divided into eight segments, 4 segments in the transmit window and 4 segments in the receive window. The width of transmitted pulses are expected to be more than one period and less than three periods of the pacing clock. As a result, the transmitted pulse will remain within the transmit window and the received pulse will remain within the receive window. The state machine maintains synchronization by observing the received bitstream and advancing or delaying the transmission of its own bit depending on the exact moment when the leading edge of the received bit is detected.

Figure 4:
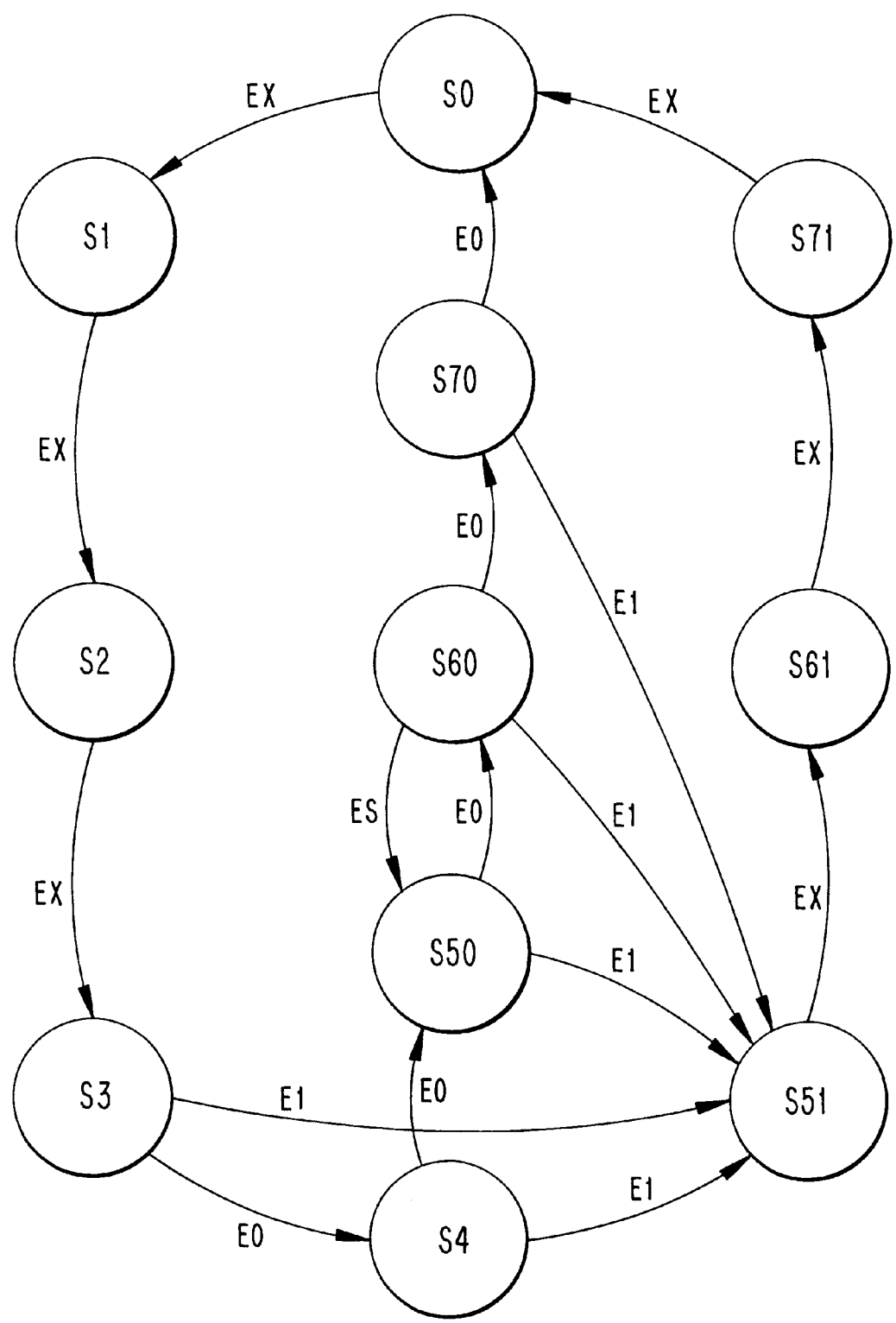
FIG. 4 illustrates a state machine according to one embodiment of the present invention.

The preferred embodiment of the invention is a state machine built within at least one of the UARTs. The state machine's diagram is shown in FIG. 4. The diagram describes a state machine that assumes a pacing clock which is eight times faster that the nominal baud rate (bits-per-second) of the transmission. However, the diagram can easily be extended to describe a state machine which uses a pacing clock whose speed is any number of times higher than eight times the nominal baud rate. All state machine states may occur within the same baud period.

The state machine is paced by the transceiver's own clock, with the machine's state changing depending on the machine's current state and events derived from two separate inputs, i.e., whether a SYNC command has been issued by the UART's master controller and whether the receiver has detected a '0' bit or a '1' bit. The events are listed and described in the following table:

| Event | Description | Rx State |
|---|---|---|
| E0 | No Sync command & receiver detected a '0' bit | 0 |
| E1 | No Sync command & receiver detected a '1' bit | 1 |
| EX | Don't care about inputs. | X |
| ES | Sync Command issued & ignore inputs. | X |

The state machine with a pacing clock eight times the baud rate has 11 possible states described below:

| State | Description | Responds to these events |
|---|---|---|
| S0 | First period within Tx window. Transceiver may not transmit. | EX |
| S1 | Second period within Tx window. Transceiver may transmit. | EX |
| S2 | Third period within Tx window. Transceiver may not transmit. | EX |
| S3 | Four period within Tx window. Transceiver may not transmit. Begin looking for Rx pulse at end of period. | E0, E1 |
| S4 | First period within Rx window. Look for Rx pulse. | E0, E1 |
| S50 | Second period within Rx window. Rx pulse not yet detected. Keep looking for Rx pulse. | E0, E1 |
| S51 | Second period within Rx window. Rx pulse previously detected. | EX |
| S60 | Third period within Rx window. Rx pulse not yet detected. Keep looking for Rx pulse. However, Sync command has precedence. | E0, E1, ES |
| S61 | Third period within Rx window. Rx pulse previously detected. | EX |
| S70 | Fourth period within Rx window. Rx pulse not yet detected. Keep looking for Rx pulse. | E0, E1 |
| S71 | Fourth period within Rx window. Rx pulse previously detected. | EX |

The state machine examines its inputs during each state's period and changes state at the next pacing clock signal. The state that the machine assumes is based both on its current state and the event detected, as shown in FIG. 4.

As illustrated in FIG. 4, during states S0, S1 and S2 the machine ignores its inputs (event Ex) and simply proceeds to the next state as the pacing clock tick occurs. If there is a bit to transmit, the UART that implements the machine may transmit during state S1. The transceiver may continue transmitting during state S2, but the transceiver can not begin transmitting during state S2. The transceiver may not transmit during any other states. During states Sx1, a pulse has already been detected and the machine may be assumed to have successfully synchronized with its peer. If a pulse is received by the end of period S3, the machine skips to S51 to re-synchronize with its peer (i.e., a state is skipped). When the UART peers are synchronized, reception of a pulse by the end of period S4 is expected. If a pulse is detected during any Sx0 state, the machine does not advance; instead it moves to state S51 to re-synchronize its receive window (which is assumed to lag) with its peer's transmit window.

When the UARTs transmit and receive time windows are properly synchronized but their pacing clocks are, as expected, slightly different, given a long enough period of time, their Tx/Rx windows will drift in time by one pacing clock period (or 12.5% of the baud period in this example). If their pacing clocks are off by 0.01%, a typical value, they will drift a pacing clock period in 1250 seconds or approximately 20 minutes. However, under normal circumstances, the state machine of the UART paced by the faster clock will skip from state S3 (or S50) to S51 once every 20 minutes causing the state machine to re-synchronize with its peer. As a result, the UARTs will easily be able to maintain an uninterrupted full duplex conversation.

State S60 is a special case in that it is the only time when a SYNC command is acted upon. Consider the possible initial condition when the UART which is communicating first becomes active. At this time, it is possible that instead of having its own transmit windows in phase with the peer's receive window, that each UART's transmit window is perfectly in phase with the other's transmit window. Since a UART is expected to ignore received inputs during its transmit window, an upper layer protocol must supervise the UART's operation to initially synchronize their transmissions.

If not already in sync, the upper layer protocol can initiate a conversation by, for example, commanding its own transceiver to produce a BREAK. A BREAK causes the UART to transmit a series of pulses, one per baud period, during the baud's period transmit window. The upper layer protocol of the peer UART, if the UART is able to detect the BREAK, is expected to acknowledge the BREAK by means prescribed for the particular protocol (i.e., start of normal communications or another BREAK). If the UART that initiated the conversation does not receive a response, its upper layer protocol may assume that the Tx/Rx windows are not properly synchronized. As a result, the upper layer protocol issues a SYNC command to its UART and re-transmits the BREAK. The UART responds to the SYNC command when its state machine enters state S60, at which time it forcibly jumps to state S50, in essence moving its own Rx window two baud periods (90 degrees) further in time. If receive pulses are at least one pacing clock period wide as proposed above, the peer UARTs will synchronize with each other within one baud period. Synchronization can also be obtained by transmitting almost any string of bits provided the peer device responds. The state machine ensures synchronization as long as 2 or more consecutive bits are detected.

The BREAK proposed to synchronize the receive and transmit windows can also be used to perform an autobaud function, which is not feasible in a normal asynchronous environment. In a normal environment, a BREAK results in a logic '0' level being maintained by the transmitter to continuously stimulate the receiving UART. However, using the pulsed, reversed logic proposed above, a BREAK results in a stream of pulses equally spaced in time, since a BREAK contains no stop bits. The receiving UART can then adjust its baud rate, in a known manner, to the stable rate detected from the incoming stream.

The following figures illustrate the type of asynchronous transceiver systems where the invention could be used. In each of the cases, the state machine required to synchronize the Tx/Rx windows is contained within the UARTs.

Figure 5:
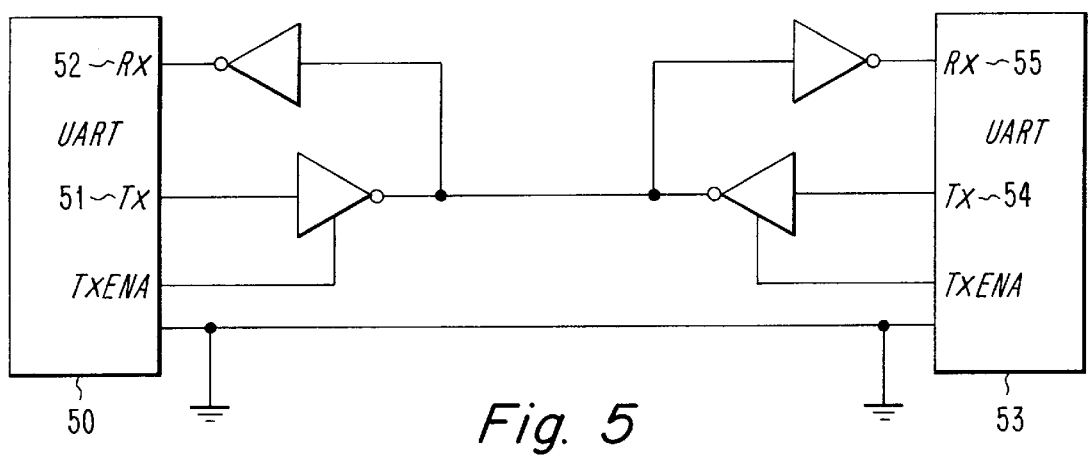
FIG. 5 illustrates a single ended system according to one embodiment of the present invention.

FIG. 5 shows a single ended system, such as could be implemented with RS-232 transceivers. In FIG. 5, a transceiver 50 has a transmitter 51 and a receiver 52 which are connected via a link to the transmitter 54 and the receiver 55 of the transceiver 53. In accordance with the present invention, at least one of the transceivers 50 or 53 is equipped with means for synchronizing the transmit/receive windows as described above. According to the present invention, the transmitter requires that the UART disables its output during its own receive window, something not normally done in RS-232 communications.

Figure 6:
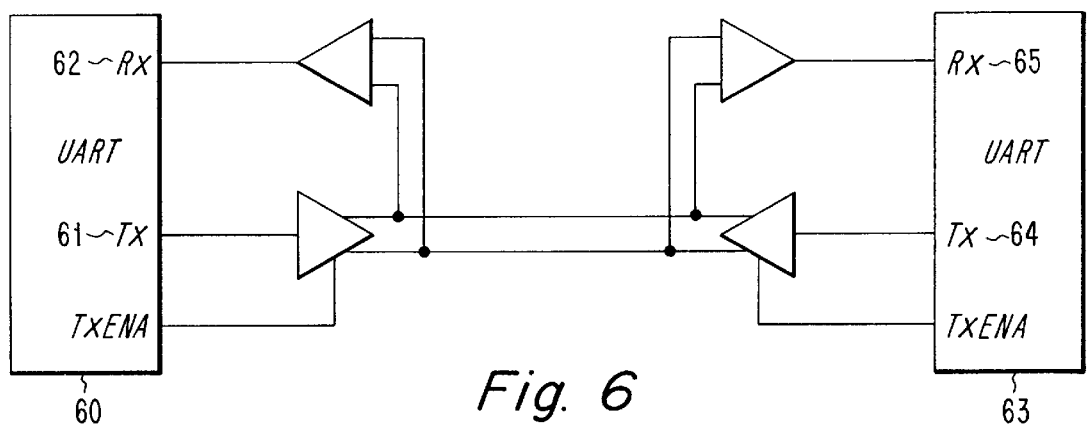
FIG. 6 illustrates a differential system according to one embodiment of the present invention.

FIG. 6 shows a differential system such as could be implemented with RS-422 transceivers. In FIG. 6, a transceiver 60 has a transmitter 61 and a receiver 62 which are connected via a link to the transmitter 64 and the receiver 65 of the transceiver 63. In accordance with the present invention, at least one of the transceivers 60 or 63 is equipped with means for synchronizing the transmit/receive windows as described above. Since these devices are normally used in multi-drop configurations, the transmitters are likely to include an input to disable their outputs during the UART's receive window.

Figure 7:
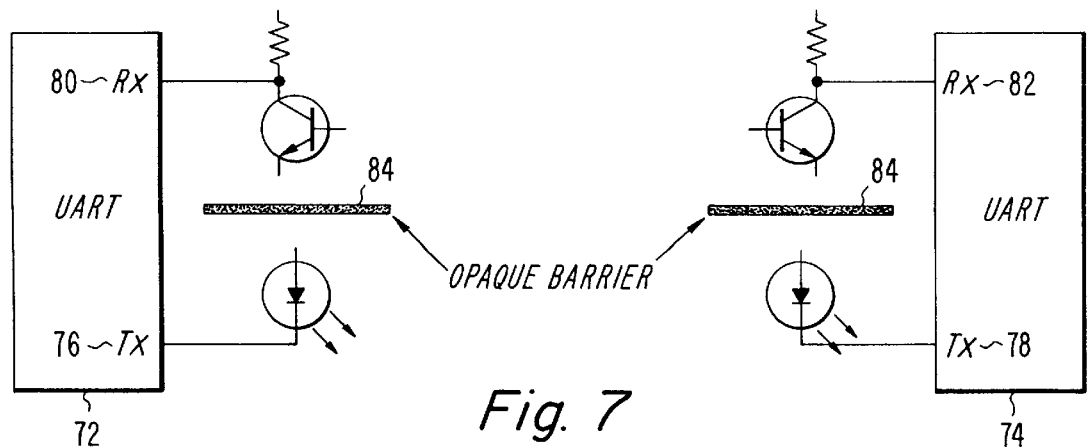
FIG. 7 illustrates an infrared system according to one embodiment of the present invention.

FIG. 7 shows an infrared system such as could be assembled using infrared components. In FIG. 7, two transceiver 72 and 74 are aligned to face each other but it will be understood by one skilled in the art that the transceiver can be placed in other configurations so long as the light from each transceiver is directed to the other transceiver. Each transceiver has an infrared transmitter 76 and 78, respectively, and an infrared receiver 80 and 82, respectively. Furthermore, at least one of the transceivers is equipped with means for synchronizing the transmit/receive windows as described above. An opaque barrier 84 is placed between each transmitter and its own receiver. The opaque barrier 84 is required because an infrared transmitter in the proximity of its own receiver will saturate its receiver when transmitting. The intensity of the light emitted is so great that the system is required to implement a "turn around time" to allow a receiver to fall out of saturation before being required to receive information. The infrared components are normally built without an opaque barrier between transmitter and receiver elements, to lower the transceiver's manufacturing cost. It may appear at first that simply placing a barrier between the elements enables the infrared components to operate in the full duplex mode, but this is not the case because objects near or in the path of the transmitted light beam may reflect the light back to the receiver. The reflected light is relatively weak and unlikely to saturate the receiver, however it may still be strong enough to generate a received signal at the UART input. Thus, if the multiplexing of the transmit/receive windows within the baud period was not implemented as proposed herein, full duplex communications would still not be possible in an infrared system.

It will be appreciated by those of ordinary skill in the art that the present invention can be embodied in other specific forms without departing from the spirit or central character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method for providing full duplex asynchronous communication between two transceivers of transmit and receive bitstreams having baud rates with corresponding bit periods, comprising the steps of:

dividing each bit period in half creating a transmit half bit period and a receive half bit period, wherein during each bit period, each transceiver can transmit data during the transmit half bit period and can receive data during the receive half bit period;

synchronizing the bit periods of the transmit and receive bitstreams so that the transmit half bit periods of one transceiver of the two transceivers are aligned with the receive half bit periods of the other transceiver, wherein a synchronization is maintained by advancing or delaying the transmission of a bit depending on when an edge transition of a received bit is detected at at least one of the transceivers, wherein a logical state of said received bit is detected by the edge transition.

2. A method according to claim 1, wherein an initial synchronization between the two transceivers is obtained by having an initiating transceiver issue a break command, wherein if a response to the break command is not received, the initiating transceiver shifts a transmit window forward.

3. A method according to claim 1, wherein the baud rates of the two transceivers can be initially determined by issuing a break command and adjusting the baud rate of the transmit bitstream to the baud rate detected from the receive bitstream.

4. A method according to claim 1, wherein an initial synchronization between the two transceivers is obtained by transmitting a stream of bits from one of the two transceivers to the other transceiver so long as the other transceiver responds to the stream of bits.

5. A communication system which allows full duplex asynchronous communication between two devices of transmit and receive bitstreams having baud rates with corresponding bit periods, comprising:

a transceiver located in each of said devices;

a communication link between said two devices over which the transmit and receive bitstreams are communicated;

means for dividing each bit period in half to create a transmit half bit period and a receive half bit period, wherein each transceiver can transmit during the transmit half bit period and can receive during the receive half bit period;

means for synchronizing the bit periods so that during each bit period, the transmit half bit period of one of the two transceivers is aligned with the receive half bit period of the other transceiver, wherein said synchronizing means maintains synchronization by advancing or delaying the transmission of a bit depending on when an edge transition of a received bit is detected at at least one of the transceivers, wherein a logical state of said received bit is detected by the edge transition.

6. A communication system according to claim 5, wherein said synchronizing means is a processor which implements a state machine.

7. A communication system according to claim 6, wherein said state machine is paced by a clock a predefined number of times faster than the baud rate of the transmit bitstream.

8. A communication system according to claim 5, wherein an initial synchronization between the two devices is obtained by having an initiating device issue a break command, wherein if a response to the break command is not received, the initiating device issues a synchronization command to its own transceiver, wherein said synchronization command causes the transceiver to shift a transmit window forward.

9. A communication system according to claim 5, wherein the baud rates of the transmit and receive bitstreams can be initially determined by issuing a break command and adjusting the baud rate of the transmit bitstream to the baud rate detected from the receive bitstream.

10. A communication system according to claim 5, wherein an initial synchronization between the two devices is obtained by transmitting a stream of bits from one device to the other device so long as said other device responds to said stream of bits.

11. A communication system according to claim 5, wherein the at least one transceiver disables its output during a receive window.

12. A communication system according to claim 5, wherein the at least one transceiver has an input which disables the transceivers output during a receive window.

13. A communication system according to claim 5, wherein said communication link is a wired serial link.

14. A communication system according to claim 5, wherein the communication link is an optical fiber.

15. A communication system according to claim 5, wherein said communication link is free space.

16. An infrared communications system which allows full duplex asynchronous communication between two infrared devices of transmit and receive bitstreams having baud rates with corresponding bit periods, comprising:

a transceiver located in each device, each transceiver comprising a transmitter and a receiver and an opaque barrier placed between each transmitter and receiver so as to shield the receiver from the transmitter, wherein the transceivers are arranged so as to receive light pulses from each other;

means for dividing each bit period in half to create a transmit half bit period and a receive half bit period, wherein each transceiver can transmit during the transmit half bit period and can receive during the receive half bit period;

means for synchronizing the bit periods so that during each bit period, the transmit half bit period of one of the two transceivers is aligned with the receive half bit period of the other transceiver, wherein said synchronizing means maintains synchronization by advancing or delaying the transmission of a bit depending on when an edge transition of a received bit is detected at at least one of the transceivers, wherein a logical state of said received bit is detected by the edge transition.

17. An infrared communications system according to claim 16, wherein said synchronizing means is a circuit which implements a state machine.

18. An infrared communications system according to claim 17, wherein said state machine is paced by a clock a predefined number of times faster than the baud rate of the transmit bitstream.

19. An infrared communications system according to claim 16, wherein an initial synchronization between the two devices is obtained by having an initiating device issue a break command, wherein if a response to the break command is not received the initiating device issues a synchronization command to its own transceiver, wherein said synchronization command causes the transceiver to skip to a next window.

20. An infrared communications system according to claim 16, wherein the baud rates of the transmit and receive bitstreams can be initially determined by issuing a break command and adjusting the baud rate of the transmit bitstream to the baud rate detected from the receive bitstream.

21. An infrared communication system according to claim 16, wherein an initial synchronization between the two devices is obtained by transmitting a stream of bits from one device to the other device so long as said other device responds to said stream of bits.

* * * * *